(No Model.)
E. L. PERRY.
HOSE OR TUBING.
No. 309,087.	Patented Dec. 9, 1884.
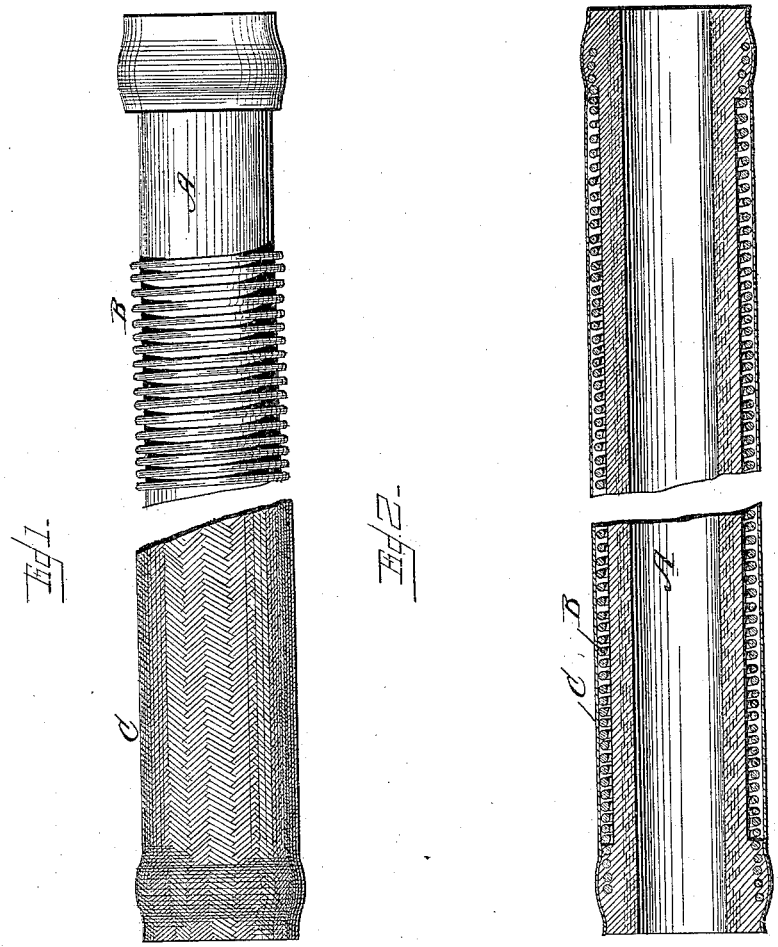
WITNESSES	INVENTOR
	Edward L. Perry,
	per Chas. H. Fowler
	Attorney

UNITED STATES PATENT OFFICE.

EDWARD L. PERRY, OF PATERSON, NEW JERSEY.

HOSE OR TUBING.

SPECIFICATION forming part of Letters Patent No. 309,087, dated December 9, 1884.

Application filed September 4, 1884. (No model.)

*To all whom it may concern:*

Be it known that I, EDWARD L. PERRY, a citizen of the United States, residing at Paterson, in the county of Passaic and State of New Jersey, have invented certain new and useful Improvements in Hose or Tubing; and I do hereby declare that the following is a full, clear, and exact description of the same, reference being had to the annexed drawings, making a part of this specification, and to the letters and figures of reference marked thereon.

Figure 1 of the drawings represents a side elevation of a hose or tubing constructed in accordance with my invention, showing the fibrous covering and wire-coil partly removed, and Fig. 2 a longitudinal section thereof.

The present invention has relation to that class of hose or tubing especially adapted for use as a connection for air-brakes or other like purposes, in contradistinction to a suction hose or tubing, wherein it is necessary to create a partial vacuum.

Previous to my invention it was common to construct a rubber hose of a series of cloth coverings, each retained in place around the rubber tube by cord or wire wound around the same, and the last one covered with a coating of rubber, which is afterward vulcanized. It is also common to strengthen suction-hose by embedding in the rubber or other material from which it is constructed a spiral coil of metal, the object thereof being to internally strengthen the walls of the hose, in order to prevent it from collapsing and yielding to outside pressure when a partial vacuum is created.

In contradistinction to the construction of hose above referred to, my invention relates to that class especially adapted to air-brake connections for which a patent was granted to me December 11, 1883, and numbered 289,854. To adapt the hose or tubing therein claimed to the uses intended, the elastic hose was provided with a covering or armor consisting of a continuous wire-coil placed loosely around the exterior of the hose, and fastened thereto at its ends or extremities only. The object of the present invention is to improve this class of hose, which consists in placing loosely around its exterior a covering of cotton or other suitable fibrous material, either woven or knitted, thus protecting the rubber hose from contact with oil and decomposing, also holding the wire-coil in place, protecting it from rust or injury, and making a much neater appearance in the hose, as will be hereinafter more fully described.

In the accompanying drawings, A represents a section of hose or tubing of rubber or other flexible material, provided upon its exterior with an armor or covering consisting, preferably, of a spiral coil, B, of wire placed loosely around the hose or tubing and secured thereto at its ends or extremities in any suitable manner.

The construction above described is the same as that of my former patent hereinbefore referred to, and also in the present instance the wire-coil is preferably made sufficiently large to leave a space between the interior diameter thereof and the exterior diameter of the hose or tubing, to allow of its expansion without pressing against the wire-coil sufficiently to injure it.

Around the wire-coil B, I place a covering, C, of fibrous material, preferably of hard-twisted cotton, either braided or woven around the surface of the wire-covered hose or tubing, thus resembling in appearance the cotton hose commonly in use.

It should be understood that the coil B is loosely placed around the hose or tubing A, the points of attachment being only at the extremities, and its purpose is to add great strength to the hose or tubing when under pressure, and not to hold up the walls in the interior of a suction-hose when a partial vacuum is created, as in the class of hose hereinbefore referred to.

The coil B, passing loosely around the hose or tubing A, requires to be retained in position thereon, which I successfully accomplish by means of the fibrous covering C, which also protects the coil from rust or injury.

The hose or tubing being especially adapted as a connection for air-brakes, it necessarily goes into the hands of railroad-men, and consequently handled by oily hands. The oil coming in contact with the rubber of the hose or tubing has long been known as one of its worst enemies, as when brought in contact therewith the rubber soon yields and becomes gummy and sticky or decomposed. The fibrous covering entirely overcomes this great objection, as it protects the rubber and prevents it from coming in contact with oily hands, the covering being purely fibrous, and not a composition of rubber placed over the coil and afterward vulcanized, as heretofore.

Having now fully described my invention, what I claim as new, and desire to secure by Letters Patent, is—

A flexible hose or tubing provided upon its exterior with an armor or covering of wire and an outer covering of fibrous material, substantially as and for the purpose set forth.

In testimony that I claim the above I have hereunto subscribed my name in the presence of two witnesses.

EDW. L. PERRY.

Witnesses:
  MAT FREUDENBERG,
  H. J. WINANS.